United States Patent [19]
Anderson et al.

[11] Patent Number: 6,014,886
[45] Date of Patent: Jan. 18, 2000

[54] GAUGE BLOCK HOLDER APPARATUS

[75] Inventors: Douglas G. Anderson; Jason D. Jordan, both of Vancouver, Wash.

[73] Assignee: SEH America, Inc., Vancouver, Wash.

[21] Appl. No.: 09/107,017

[22] Filed: Jun. 30, 1998

[51] Int. Cl.[7] ................................................. G01B 5/06
[52] U.S. Cl. ............................. 73/1.81; 33/502; 33/567
[58] Field of Search .............................. 73/1.81; 33/502, 33/567, 567.1

[56] References Cited

U.S. PATENT DOCUMENTS

| | | | |
|---|---|---|---|
| D. 257,332 | 10/1980 | Lewis ........................................ D10/85 |
| D. 258,381 | 2/1981 | Lewis ......................................... D23/1 |
| 3,623,277 | 11/1971 | Bottcher et al. ......................... 451/276 |
| 3,936,945 | 2/1976 | Jevremov . | |
| 4,015,513 | 4/1977 | Ditzel et al. ............................. 409/204 |
| 4,283,939 | 8/1981 | Edward, Jr. ................................. 73/81 |
| 4,373,267 | 2/1983 | Lycan . | |
| 4,416,570 | 11/1983 | Argenbright ............................ 409/222 |
| 4,420,888 | 12/1983 | Wakao et al. . | |
| 4,445,276 | 5/1984 | Voneky et al. . | |
| 4,813,152 | 3/1989 | Spencer ..................................... 33/638 |
| 5,074,050 | 12/1991 | Williams .............................. 33/501.03 |
| 5,113,592 | 5/1992 | Possati .................................... 33/567.1 |
| 5,148,611 | 9/1992 | Raetzel ...................................... 33/783 |
| 5,231,768 | 8/1993 | Beckwith, Jr. ............................ 33/567 |
| 5,363,562 | 11/1994 | Schmidt ................................. 33/567.1 |
| 5,666,394 | 9/1997 | Swanson ................................... 378/89 |

*Primary Examiner*—Thomas P. Noland
*Attorney, Agent, or Firm*—Kolisch Hartwell Dickinson McCormack & Heuser

[57] ABSTRACT

A gauge block holder that greatly reduces measurement error in calibrating wafer thickness test equipment is described. In a preferred embodiment of the invention, the gauge block holder is compatible with present thickness measurement equipment and provides a central region specially configured for holding a prior art gauge block in a manner that ensures precise, parallel alignment thereof with the equipment and thus precise perpendicular alignment with the equipment's opposing contact pins. Preferably a gauge block-sized and shaped recess and aperture are provided centrally in the holder such that the gauge block rests immobile on and parallel with the precision-machined, planar upper surface of a metal plate of the thickness tester while the thickness tester is being calibrated for a given wafer thickness measurement. The recess and aperture in accordance with their preferred embodiment are rectangular, and the invented gauge block preferably is securely fastened to the metal plate, e.g. with screws, although alternative configurations and fasteners are contemplated for accurate, repeatable calibration with alternative gauge blocks.

9 Claims, 7 Drawing Sheets

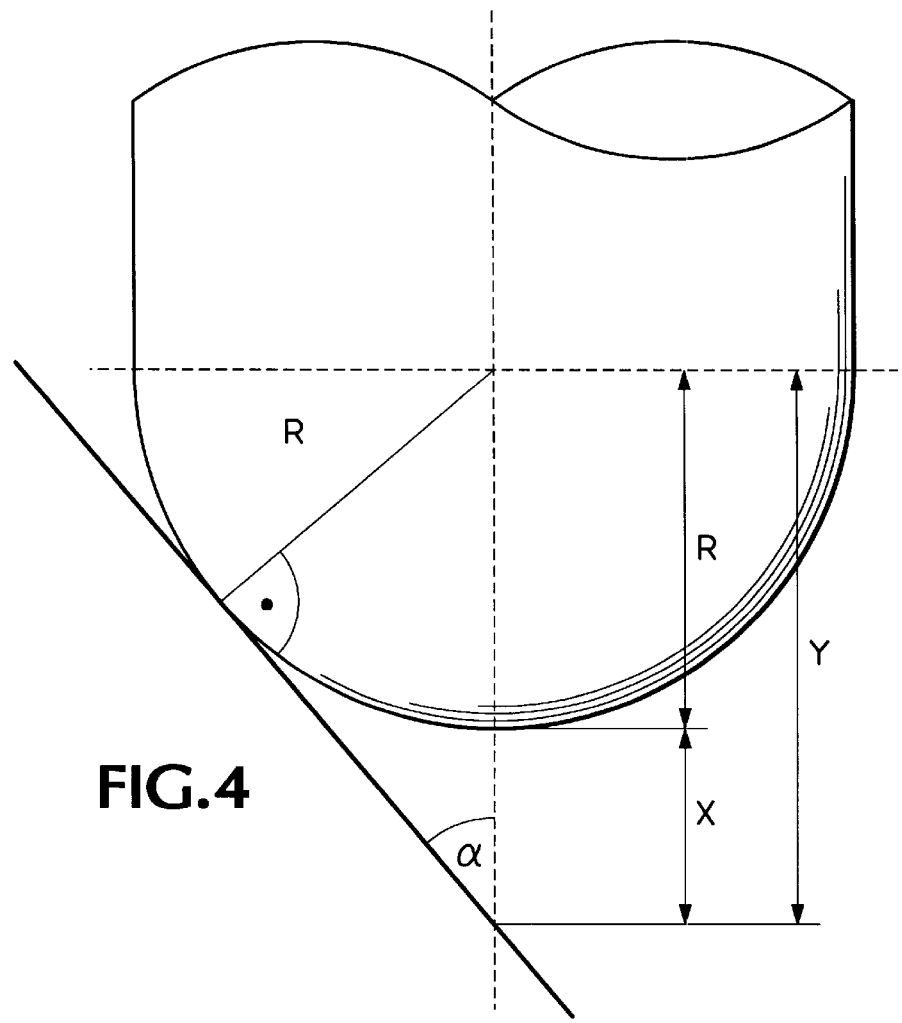
FIG.4
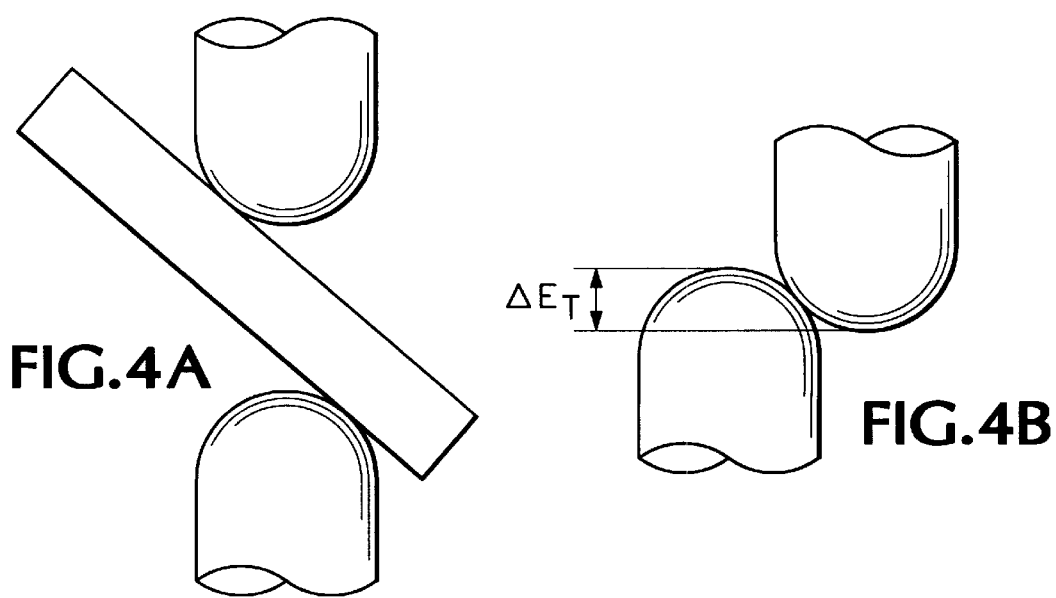
FIG.4A
FIG.4B 6,014,886

GAUGE BLOCK HOLDER APPARATUS

TECHNICAL FIELD

The present invention relates generally to semiconductor wafers. More particularly, it concerns thickness gauge block holder apparatus that reduces thickness measurement error in the manufacture of semiconductor wafers.

BACKGROUND ART

The process of manufacturing semiconductor wafers involves the pulling of a single crystal ingot from the melt, then cropping it at the seed and tang ends. The cylindrical crystal is then ground to achieve a specified diameter, and then wafers are sliced from the cropped and ground ingot. To remove any slicing damage, each wafer is ground and then etched to remove lapping damage. Each wafer is then mirror polished. Silicon wafers may be subject during processing to laser marking, backside damage and film deposition, front side epitaxial deposition and other intentional and inadvertent processes, depending upon customer specifications.

Referring first to FIGS. 1 and 2, prior art wafer measurement apparatus indicated generally at 10 will be described. Conventionally, caliper-type gauges are used to measure the thickness of semiconductor wafers, wherein a movable upper contact pin 12 and a fixed lower contact pin 14 are made to contact a wafer under test 16 (shown in phantom by dashed lines) on its upper and lower surfaces 16a, 16b, respectively. Wafer 16 is supported by a heavy aluminum base plate 18 onto which a metal plate 20 is affixed, as by screws 22 (not shown in FIG. 1, but shown in FIG. 2). Metal plate 20 typically contains ball bearings such as ball bearings 24 to produce virtually friction-free movement thereon of wafer under test 16.

Typically, a pair of pin slots 26, 28 are provided for insertion of a pair of diameter pins 30, 32 in one of plural pairs of pin holes 34, 36; 38, 40; 42, 44; 46, 48; 50, 52. It will be understood that the pair of diameter pins is placed to accommodate any one of a number of nominal wafer diameters, e.g. 100 millimeter (mm), 125 mm, 150 mm (as depicted in FIGS. 1 and 2) and 200 mm, with the inserted diameter pins effectively centering the wafer under test relative to the upper and lower contact pins.

Wafer thickness is measured after first 'zeroing' or 'zeroing in' a precision analogue or digital gauge or meter (not shown). Without a wafer under test resting on the ball bearings of metal plate 20, the gauge should indicate precisely zero thickness, since upper and lower contact pins 12, 14 will contact one another under the urging of a relatively strong tension probe spring 54 via a washer 56 to which upper contact pin 12 mounted on the lower tip end of an upper probe head 58 is connected. Any adjustments that are needed to zero the connected meter are made, and then upper contact pin 12 is raised by the user via a lift block 60. Lift block 60 is connected via a retractor extension 62 to a pivotal probe retractor 64, an arm of which engages washer 56 as illustrated. Probe retractor 64 is connected by a pin 66 for pivotal rotation in a generally vertical plane to a retractor joint block 68 mounted on an L-shaped extension block 70. A relatively weak retraction spring 72 connected between retractor 64 and a spring holder 74 mounted on extension block 70 assists the operator in raising lift block 60.

Those of skill in the particular art, especially those familiar with the illustrated Tokyo Seimitsu "Miniax" model DH151 wafer thickness test equipment, will appreciate finally that thickness tester 10 typically further includes a sensor pin 76, a spring fixture 78, a thread bolt 80 and corresponding nut 82, a mechanical, electromagnetic, piezoelectric or other suitable displacement sensor 84, a structural probe column 86 for mounting certain test components of the head of the equipment, and a cable 88, shown only fragmentarily as extending toward an RS-232- or other-type meter, not shown. Such features are typical of wafer thickness test equipment, and, indeed, of thickness test equipment in general.

Next, wafer under test 16 is made to rest, centered between an inserted pair of diameter pins 30, 32, on the ball bearings of metal plate 20 such that its lower surface 16b is in contact with lower contact pin 14. Probe spring 54 urges upper contact pin 12 against upper surface 16a of wafer 16, and the thickness of the wafer is indicated by the meter as the difference between the normally at-rest, in-contact positions of the contact pins and the wafer-produced, separated distance therebetween, wherein the separation is attributable to the thickness of the wafer. It is noted that the tips of upper and lower contact pins 12, 14 preferably are spherical to achieve point contact with wafer 16, thereby to maximize accuracy in the thickness measurement, and to reduce contact pin-induced defects, such as scratches, on the surface of the wafers.

Periodic calibration of the thickness gauge is necessary, and typically uses a certified gauge block 90 representative of national standards. Gauge blocks come in a variety of thicknesses, e.g. 400 micrometers ($\mu$m) to 1000 $\mu$m in 50 $\mu$m increments. To calibrate thickness tester 10, gauge block 90 of standard thickness is placed into thickness tester 10, and the thickness of gauge block 90 is measured, with the gauge's thickness reading being adjusted to the standard by adjustment of the reading of the meter that forms a part of thickness tester 10 until it reads precisely the thickness of the standard represented by gauge block 90.

Typically, such gauge blocks are momentarily inserted between the upper and lower contact pins of the thickness tester 10 by hand. The problem with this prior art approach is that calibration error may be introduced during the calibration procedure if gauge block 90 is not precisely perpendicular to the contact pins during measurement and calibration adjustment. In other words, it is possible to insert the gauge block in a slightly out-of-perpendicular orientation between the upper and lower contact pins, which introduces error. Moreover, it is possible—since gauge block 90 typically is simply held by hand—for the gauge block to wobble between the upper and lower contact pins, thus producing a dubious reading even if held precisely in a perpendicular orientation immediately before and/or after the reading of the meter is made.

Such an out-of-perpendicular orientation of a gauge block is shown in FIG. 3, an enlarged, fragmentary side elevation corresponding to FIG. 1 and bearing identical reference designators (and with base plate 18 omitted for the sake of clarity). Gauge block 90 may be seen to be tipped, or inclined, such that it is not oriented parallel to metal plate 20. It may be appreciated that, due to this slight misorientation—which is typical because gauge block 90 typically is inserted between upper and lower contacts 12, 14 by hand—the distance between upper and lower contacts 12, 14 does not accurately represent the thickness of gauge block 90. As a result, the operator of thickness tester 10 might erroneously adjust the meter connected thereto to the standard gauge or thickness represented by the gauge block. Thereafter, unless and until thickness tester 10 is properly calibrated, it will tend to yield erroneously high wafer thickness readings. Such resulting thickness calibration errors are by no means negligible, as will be seen.

Referring to FIG. 4, one can calculate the possible measurement error when gauge blocks are positioned between the probes at an angle not equal to 90° or perpendicular to the probe axis. The probe diameter is known and the angle, α, can be assumed for any error calculation. With the radius, R, known, and the angle, α, given, the following expression holds true:

$$Y = \frac{R}{\sin\alpha}. \tag{1}$$

Thus, $$X = Y - R = \frac{R}{\sin\alpha} - R. \tag{2}$$

Since two contact pins, i.e., the upper and lower probe, are involved as shown in FIG. 4A, the total thickness error is:

$$E = 2X \tag{3}.$$

For example, if the probe tip radius is 1000 μm and the gauge block angle, α, is 85°, then the resulting error would be approximately 7.64 μm, which represents approximately a 10% thickness measurement error, in the case of a typical 150 mm diameter wafer.

Another source of potential error $\Delta E_T$ is schematically shown in FIG. 4B. If the pins are not exactly opposite to each other during reset (zero in), then all subsequent readings will show an erroneous result, possibly cumulative with an inaccurate angle of the gauge block illustrated in FIG. 4A. Such equipment set-up limitations, shortcomings and intrinsic measurement errors all are overcome by the invented gauge block holder apparatus.

DISCLOSURE OF THE INVENTION

Briefly, the invented apparatus involves the use of a gauge block holder that greatly reduces measurement error in calibrating wafer thickness test equipment. In a preferred embodiment of the invention, the gauge block holder compatible with present thickness measurement equipment but having a central region specially configured for holding a prior art gauge block in a manner that ensures precise, perpendicular alignment thereof with the equipment (relative to the contact pins). Preferably a gauge block-sized and shaped recess and aperture are provided centrally in the holder such that the gauge block rests immobile on and parallel with the precision-machined, planar upper surface of the base metal plate of the thickness tester while the thickness tester is being calibrated for a given wafer thickness measurement. The recess and aperture in accordance with their preferred embodiment are rectangular, and the gauge block preferably is securely fastened to the base metal plate, e.g. with screws, although alternative configurations and fastening means are contemplated for accurate, repeatable calibration with alternative gauge blocks.

These and additional objects and advantages of the present invention will be more readily understood after consideration of the drawings and the detailed description of the preferred embodiment which follows.

BRIEF DESCRIPTION OF THE DRAWINGS

FIGS. 4, 4A and 4B represent a geometric and mathematical model illustrating the intrinsic measurement error formulation.

DETAILED DESCRIPTION OF THE PREFERRED EMBODIMENTS AND BEST MODE OF CARRYING OUT THE INVENTION

Figure 1:
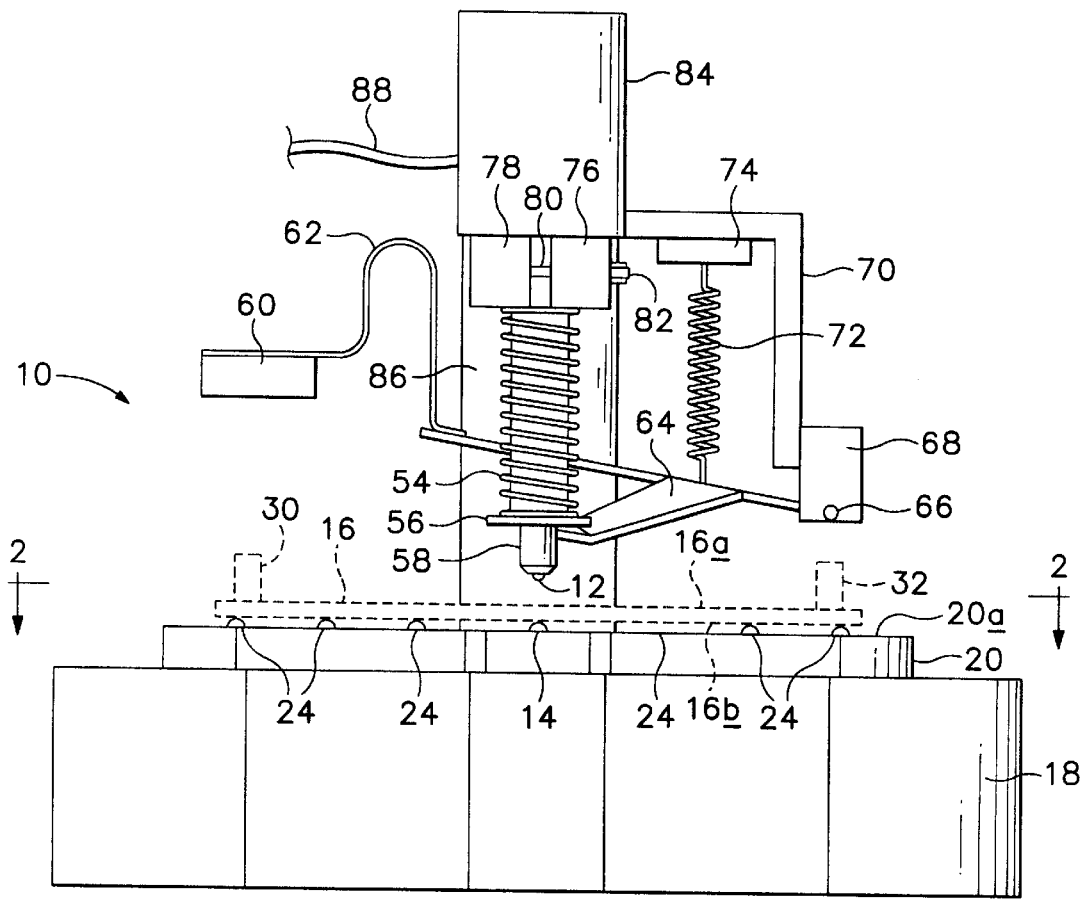
FIG. 1 is a simplified representation of prior ail wafer thickness measurement apparatus in a side elevational view.
Figure 2:
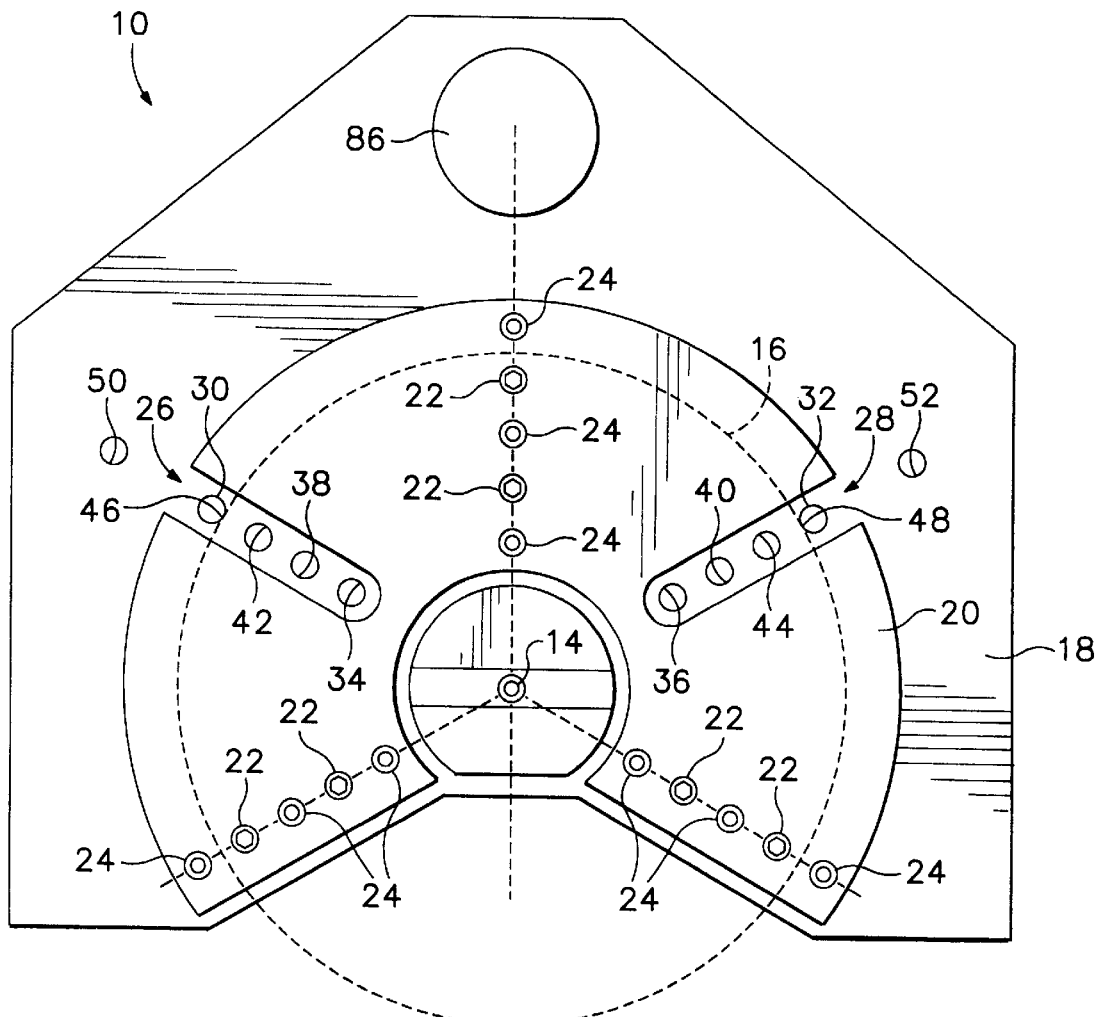
FIG. 2 is a simplified top plan view of the prior art apparatus taken generally along the lines 2—2 in FIG. 1.
Figure 3:
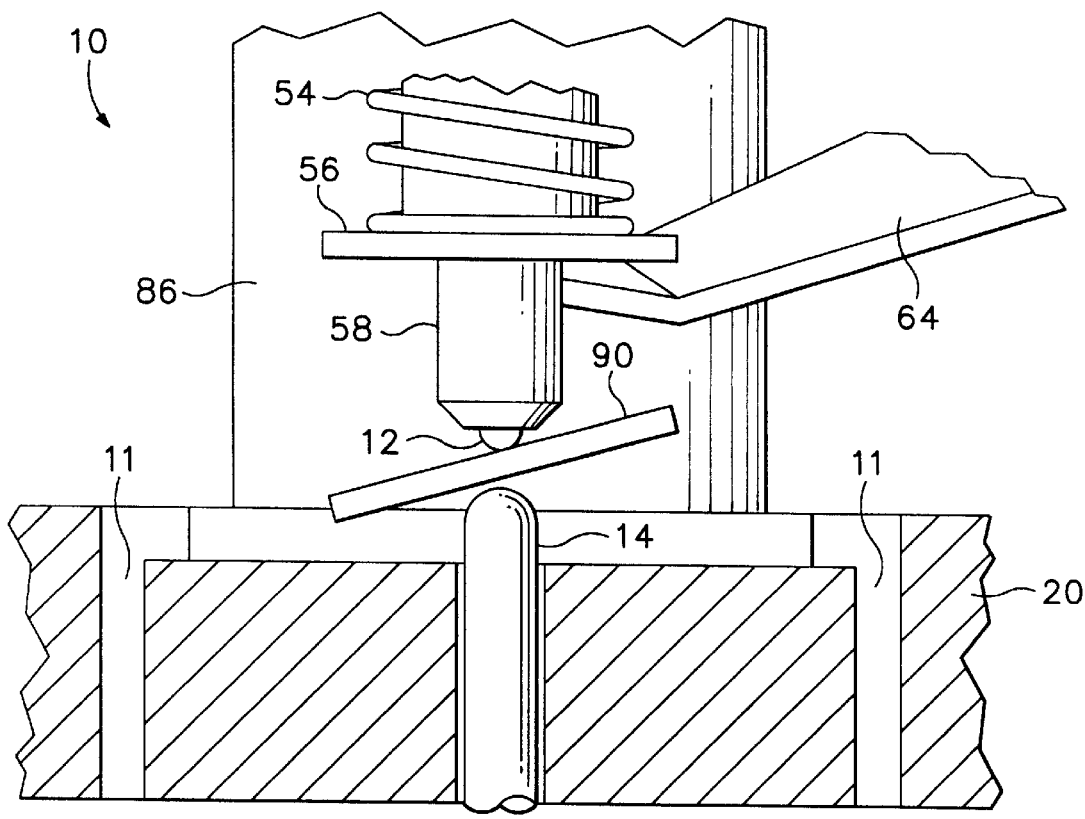
FIG. 3 is an enlarged, fragmentary representation corresponding to FIG. 1, which illustrates thickness measurement error intrinsic to the use of prior art wafer thickness measurement apparatus.
Figure 5:
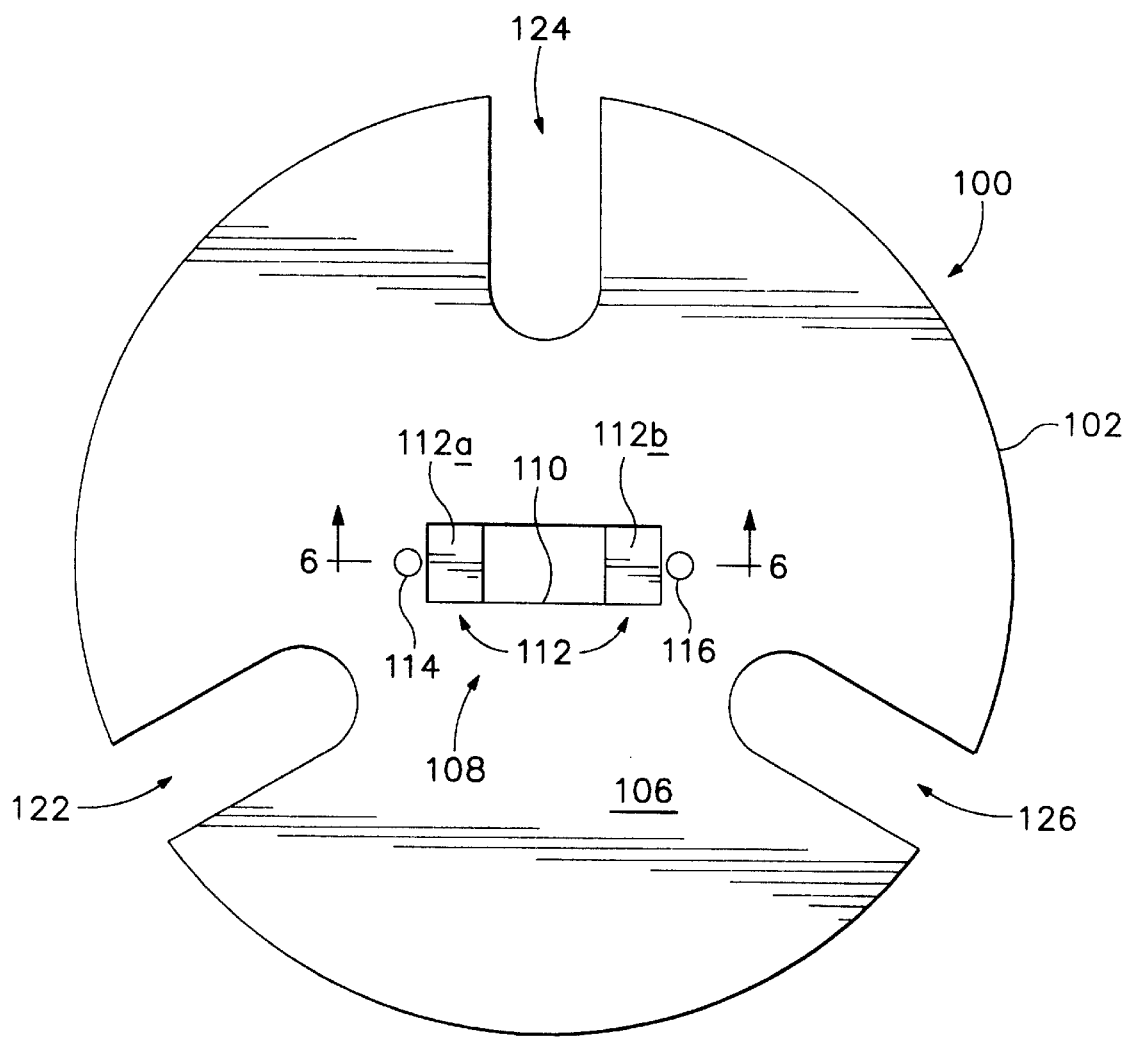
FIG. 5 is a top plan view of the invented gauge block holder made in accordance with its preferred embodiment.
Figure 6:
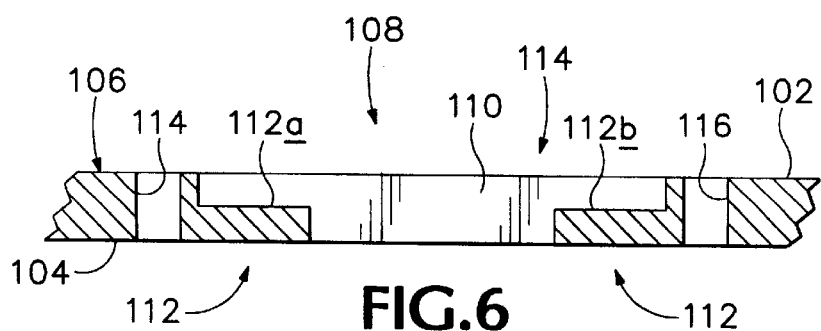
FIG. 6 is an enlarged, fragmentary, side elevation of the gauge block holder taken generally along the lines 6—6 in FIG. 5.

Referring now to FIGS. 5 and 6, the invented holder apparatus will be described, with the above detailed background as context. The invention may be thought of broadly as a holder, indicated at 100 in FIGS. 5 through 8, for a planar thickness gauge block 90 generally of the type described above (refer to FIG. 3). Such blocks most broadly may be understood to be useful in a variety of measurement applications not limited to semiconductor wafer manufacture. Thus, the blocks may be described generally for use in calibrating caliper-type thickness measurement equipment, of which thickness tester 10 for testing the thickness of semiconductor wafers is only one example, wherein the equipment includes an upper movable contact pin, e.g. pin 12 and an opposing lower contact pin, e.g. pin 14, fixed relative to a base, e.g. metal plate 20, having a planar upper surface, e.g. upper surface 20a. Such equipment as thickness tester 10 will be understood to be of the type that provides a thickness indication representing the distance between the upper and lower contact pins.

For use with such equipment in accordance with the invention, holder 100 may be seen from FIGS. 5 and 6 to include a plate 102 having a planar lower surface 104 for resting flatly on such planar upper surface 20a of such base. Plate 102 further includes a generally planar upper expanse indicated generally at 106, a generally central region 108 of which has machined therein a through aperture 110 dimensioned to permit entry therein of such lower contact pin 14. Central region 108 further has on either side of aperture 110 a shoulder region 112 formed by machining a recess 114 into upper expanse 106 around aperture 110. Importantly, shoulder region 112 is parallel-planar with lower surface 104.

As may be understood best, perhaps, by reference to FIG. 6, the thickness of invented plate 102 in shoulder region 112 thereof is uniformly dimensioned to elevate shoulder region 112 above the plane of upper surface 20a of base 20 to the height of an uppermost point of lower contact 14. Preferably, aperture 110 with shoulder region 112 therearound is of predefined lateral extent within the plane of invented plate 102 to support such a thickness gauge as thickness gauge block 90 on shoulder region 112 so that such upper movable contact pin 12 is capable of contacting the upper surface of such thickness gauge block 90 to provide a readout by the equipment representing the thickness dimension of the gauge block, as on the connected precision meter (not shown).

As may be understood, preferably invented plate 102 is machined from a metal material, and most preferably the metal material is aluminum. It has been found that such a hardened material is virtually impervious to dings and nicks and other environmental conditions that might otherwise compromise its dimensional and planar integrity, although other suitable materials are contemplated and are within the spirit and scope of the invention.

Figure 7:
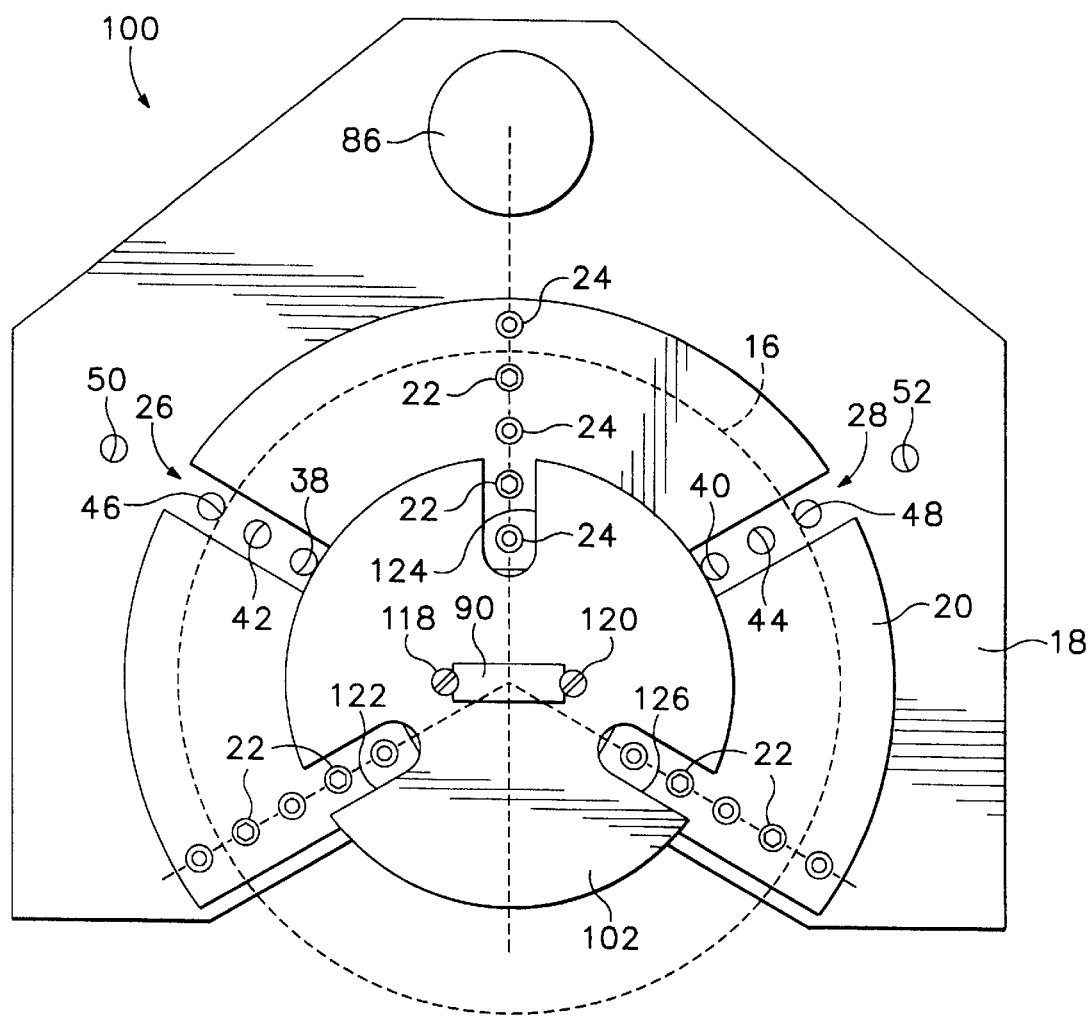
FIG. 7 is a top plan view illustrating the invented gauge block holder installed in the prior art wafer measurement apparatus.
Figure 8:
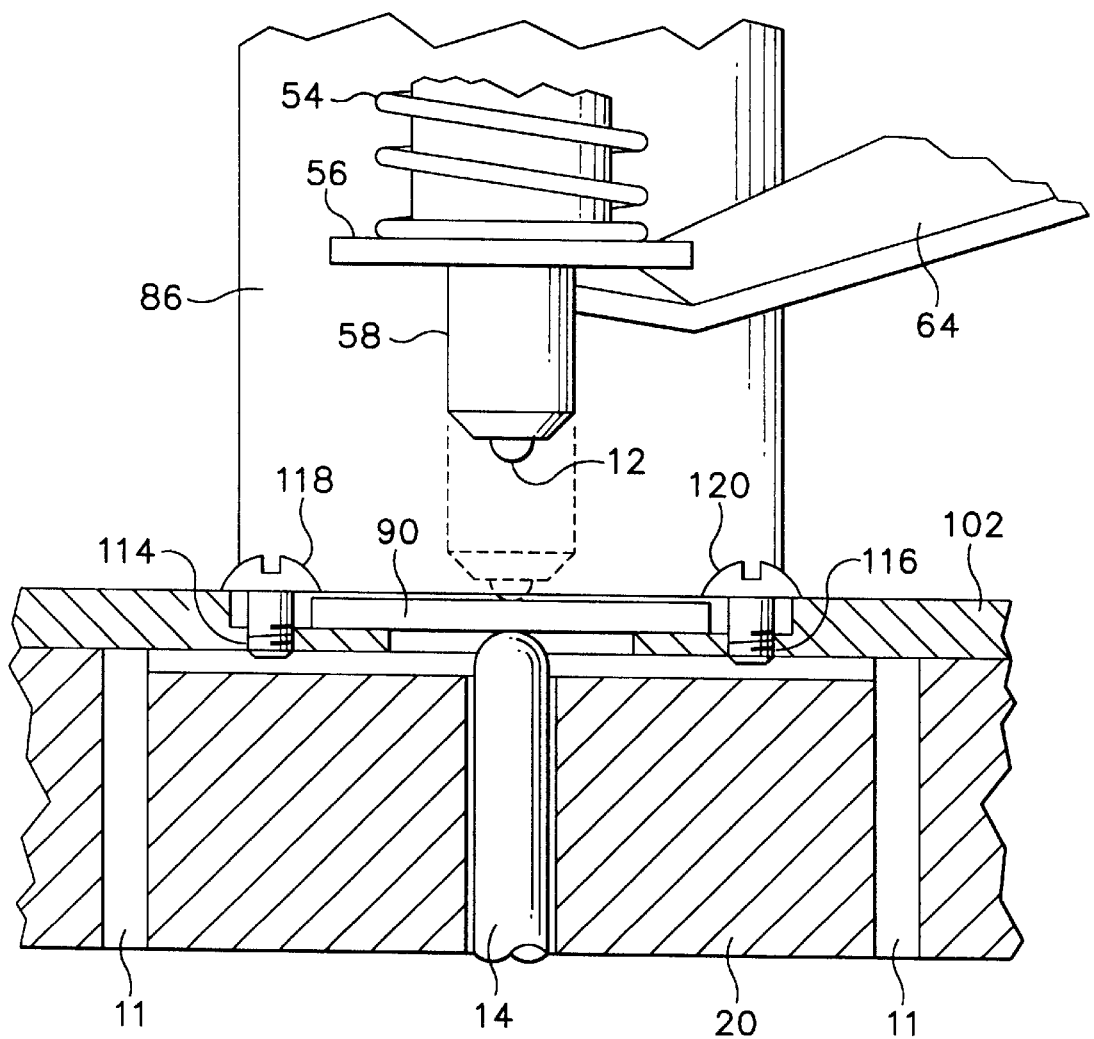
FIG. 8 is an enlarged, fragmentary side elevation corresponding to FIG. 7 and showing the thickness probe in two different positions relative to the gauge block.

As may be seen from FIGS. 6 through 8, recess 114 preferably is rectilinear, and most preferably right-rectangular in all three dimensions, although it will be understood by those of skill in the arts that the interior configuration of recess 114 is dependent upon the exterior configuration of the gauge block which it is intended to hold. Accordingly, those of skill in the arts will appreciate that the aperture and recess may be of any suitable configuration that supports the gauge block while permitting upper and lower contacts of the thickness tester directly to contact corresponding upper and lower surfaces thereof. For example, other gauge blocks may be circular, and aperture 110 and/or recess 114 may be annular, with an infinite number of circumferential contact points or as few, for example, as three, to stably support the gauge block in the holder such that its lower surface is precisely parallel with the upper surface of the base of the test equipment (and thus precisely perpendicular to the long axes of the contact pins).

Thus, while shoulder region 112 is subdivided into two opposing shoulder regions 112a, 112b in accordance with the preferred embodiment of the invention, each subregion of which is rectilinear, it is appreciated that there may be no such subdivision and no such rectilinearity for use of the invented gauge holder with other gauges.

It may be seen from FIG. 7 that plate 102 preferably has one or more, e.g. two, threaded receivers 114, 116 connected therewith, preferably in the form of holes formed therein. In order to secure gauge 90 within recess 112 of plate 102, holder apparatus 100 preferably further includes one or more, e.g. two, set screws 118, 120 for securing plate gauge block 90 to plate 102 via such threaded receivers. It will be appreciated that threaded receivers 114, 116 may take alternative forms, within the spirit and scope of the invention, and may secure the gauge block to invented plate 102 in any suitable manner to ensure its flatly planar mating with the upper surface of base 20 of thickness tester 10.

In accordance with the invention, which has been found to have particular utility in the thickness testing of circular semiconductor wafers, plate 102 is preferably generally thin and circular. Those of skill will appreciate that alternative thickness test equipment might have very different shapes and configurations in their bases that provide the fixed contact pin for caliper-type thickness measurement, and that the invented holder within the spirit and scope of the invention may assume any useful form that is compatible with such thickness test equipment.

As described above in the context of semiconductor wafer thickness testing, base 20 includes one or more allays of ball bearings 24 projecting upwardly from its planar upper surface 20a. Thus, plate 102 preferably further includes one or more, e.g. three, radial slots 122, 124, 126 alignable with the one or more arrays of ball bearings 24, with the ball bearings extending into corresponding ones of the slots, as shown best in FIG. 7. While it is appreciated that the invention has been found to be especially useful when the thickness measurement equipment is a semiconductor wafer thickness tester, its application in myriad other thickness test equipment calibration and maintenance contexts should be apparent to those of skill in the arts, all of which applications are within the spirit and scope of the invention.

Method of Use of the Invented Device

Use of the invented gauge block holder may be understood from the above description of the thickness test equipment, gauge block and invented gauge block holder, and by brief reference to FIGS. 7 and 8. The invented gauge block holder 100 is generally centered atop metal plate 20 as shown in FIG. 7, with the three radial slots aligned with the radial arrays of ball bearings such that plate 102 rests flatly against the upper planar surface 20a of metal plate 20. Gauge holder 90 is then placed within the recess and aperture provided in holder 100 on either shoulder region 112 and preferably fixed to metal plate 20 as by screws 114, 116 as shown in FIG. 8. Calibration of the connected meter of the thickness test equipment proceeds otherwise conventionally, as by lowering upper contact 12 to the upper surface of gauge 90 (as shown in phantom outline) while lower contact 14 extending through aperture 110 is in contact with the lower surface of gauge 90, but with far more precise angular alignment and thus thickness measurement precision in calibration than is possible with conventional hand-gripping of the gauge holder without benefit of the invented holder.

Accordingly, while the present invention has been shown and described with reference to the foregoing preferred device and method for its use, it will be apparent to those skilled in the art that other changes in form and detail may be made therein without departing from the spirit and scope of the invention as defined in the appended claims.

We claim:

1. Holder apparatus for a planar thickness gauge block for use in calibrating caliper-type thickness measurement equipment, wherein the equipment includes an upper movable contact pin and an opposing lower contact pin fixed relative to a base having a planar upper surface and wherein the equipment provides a thickness indication representing the distance between the upper and lower contact pins, the holder apparatus comprising:

a plate including a planar lower surface for resting flatly on such planar upper surface of such base, said plate further including a generally planar upper expanse, a generally central region of which has machined therein, a through aperture dimensioned to permit entry therein of such lower contact pin and having on either side of said aperture a shoulder region formed by machining a recess into said upper expanse around said aperture, said shoulder region being parallel-planar with said lower surface with the thickness of said plate in said shoulder region being uniformly dimensioned to elevate the shoulder region above such base to the height of an uppermost point of the lower contact, said aperture with said shoulder region therearound being of predefined lateral extent within the plane of said plate to support such thickness gauge on said shoulder region so that such upper movable contact pin is capable of contacting an upper surface of such thickness gauge to provide a readout by the equipment representing the thickness dimension of the gauge block.

2. The apparatus of claim 1, wherein said plate is machined from a metal material.

3. The apparatus of claim 2, wherein said metal material is aluminum.

4. The apparatus of claim 1, wherein said recess is rectilinear.

5. The apparatus of claim 4, wherein said shoulder region is subdivided into two opposing shoulder regions each of which is rectilinear.

6. The apparatus of claim 4, wherein the plate has one or more threaded holes formed therein adjacent said recess, which apparatus further comprises one or more screws for securing said holder to such plate via such threaded holes.

7. The apparatus of claim 1, wherein said plate is generally circular.

8. The apparatus of claim 7 in which such base includes one or more arrays of ball bearings projecting upwardly from the planar upper surface of the base, wherein said plate further includes one or more radial slots alignable with the one or more arrays of ball bearings with the ball bearings extending into corresponding ones of said slots.

9. The apparatus of claim 1 wherein the thickness measurement equipment is a semiconductor wafer thickness tester.

* * * * *